Dec. 14, 1943.   R. C. STOLTE   2,336,511
MOUNTING OF STEERING GEARS
Filed Oct. 2, 1942
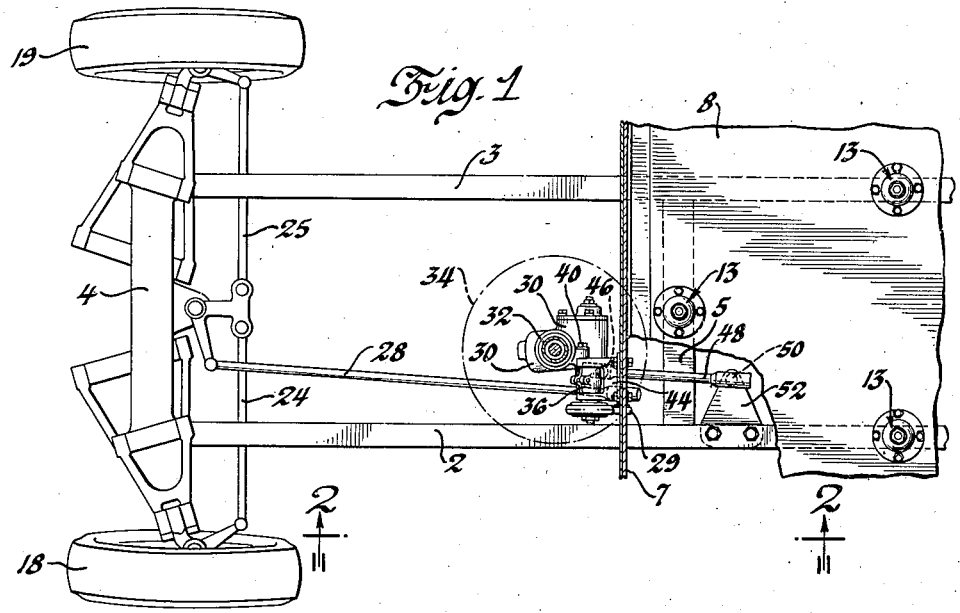
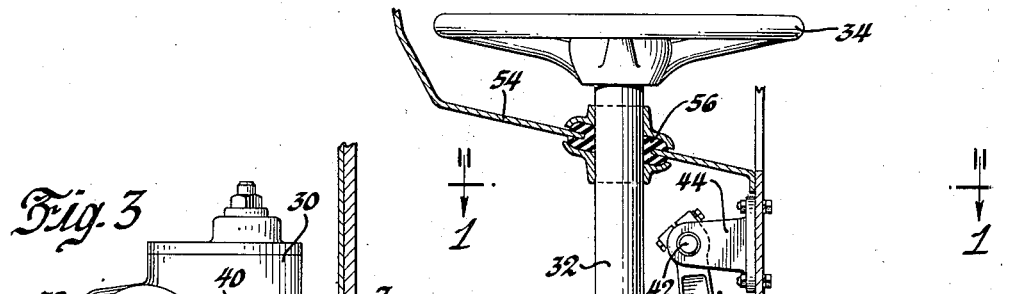
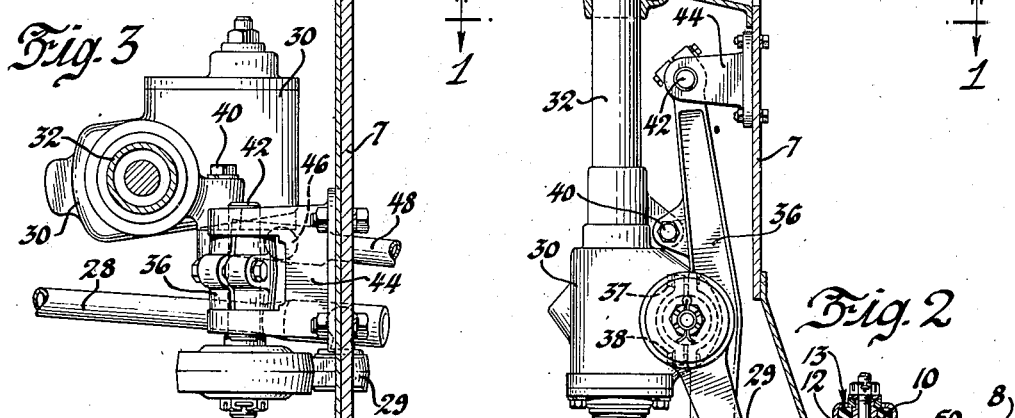
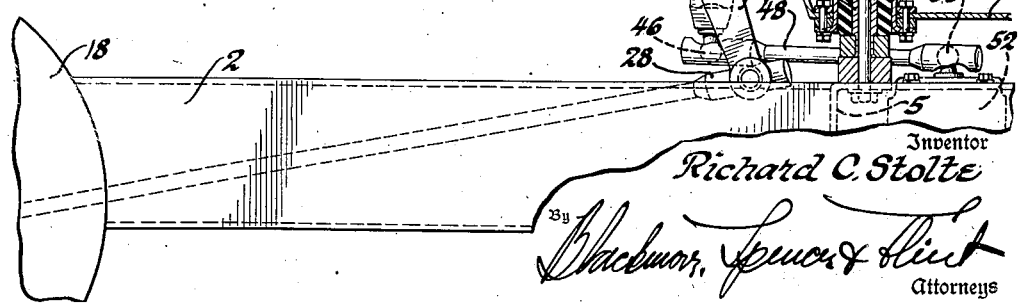
Inventor
Richard C. Stolte
By Blackmor, Spencer & Hint
Attorneys Patented Dec. 14, 1943

2,336,511

UNITED STATES PATENT OFFICE 2,336,511

MOUNTING OF STEERING GEARS

Richard C. Stolte, Birmingham, Mich., assignor to General Motors Corporation, Detroit, Mich., a corporation of Delaware Application October 2, 1942, Serial No. 460,541

2 Claims. (Cl. 280—87)

This invention relates to steering gears and especially to a steering gear for a vehicle of which the body is resiliently mounted on the frame with freedom for a degree of relative longitudinal movement therebetween, and the vehicle is such that it is inconvenient if not impossible to mount the steering gear on the frame as is usual, thus making it necessary to mount or support the steering gear on the body, which moves relatively to the frame to which the wheels to be steered are connected.

The object of the invention is a means of supporting the steering gear on the body of such a vehicle while enabling it to partake of the movement of the frame relatively to the body, so that the movement of the frame relatively to the body will not cause undesired steering movement of the dirigible road wheels and their linkages, relatively to the vehicle frame to which they are connected.

The above and other objects of the invention will be apparent as the description proceeds.

According to the invention, the steering gear housing is suspended from a transverse pivot axis on the body, there being a longitudinally disposed link between the steering gear housing and the vehicle frame, by which said housing is swung about its pivot axis to partake of any longitudinal movement of the frame relatively to the body.

The drawing shows a construction according to the invention.

In the drawing

Figure 1 is a plan view of the steering gear and connected parts, on line 1—1 of Figure 2.

Figure 2 is an enlarged side elevational view on line 2—2 of Figure 1.

Figure 3 is an enlarged view of a part of Figure 1.

The frame of the vehicle includes longitudinal members 2 and 3 and transverse members 4 and 5.

The body includes a vertically disposed plate 7 welded to a floor plate 8, and is resiliently supported on the frame with freedom for a degree of longitudinal movement relative thereto, by means of rubber bushings such as 10 of which the inner and outer peripheries are respectively bonded or otherwise secured to parts 12 and 13 respectively secured to the frame and the body as shown in Figure 2 or vice versa.

The road wheels 18 and 19 are independently connected to the vehicle frame in well known way, for dirigible movement relatively thereto, and are provided with a conventional steering linkage including tie rods 24 and 25 and as a drag link 28 connected to the pitman arm 29 of a steering gear in a housing 30.

The steering gear housing 30 with an upwardly extending column 32 supporting a steering wheel 34, is pivotally suspended on the body; it being secured to a bar 36 by bolts such as 37, 38, and 40 (Figure 2) and the said bar having a pivot pin 42 by which it is suspended from a bracket 44 on the plate 7 of the body.

The lower end of the bar 36 is ball jointed at 46 to a longitudinally disposed link 48 of which the other end is ball jointed at 50 to a bracket 52 on the vehicle frame member 2.

The upper end of the steering column 32 extends through an upswept body member 54 welded to the plate 7, and is resiliently supported by the member 54 through the medium of a rubber thimble 56.

It will be seen that upon longitudinal movement of the frame relatively to the body, the steering gear housing 30 is moved by the link 48 in an arc of a circle about the pivot axis 42, and along with it, the pitman arm 29 is moved about the same axis in an arc of a circle of greater radius. Since the pitman arm 29 to which the drag link 28 is connected, and the ball end 46 of the bar 36 to which the longitudinal link 48 is connected, are approximately equidistant from the pivot axis 42, and are approximately in the substantially horizontal plane of the said link 48 which is approximately tangential to the last said arc, the end of the pitman arm together with the drag link is moved longitudinally relatively to the body, a distance approximately equal to the distance which the frame moves relatively to the body. In other words, the position of the end of the pitman arm relatively to the frame is virtually unaffected by longitudinal movement of the body relatively to the frame which is permitted by the flexible mountings 10, and although the steering gear is mainly supported on the body, it is otherwise as though it were mounted on the frame, and independent of the movements of the body relatively to the frame.

I claim:

1. In a vehicle, in combination, a frame with road wheels mounted for dirigible movement relatively thereto, a body mounted on said frame with freedom for a degree of longitudinal movement relatively to the frame, a steering gear in a housing rigidly connected to a vertically disposed bar forming an extension of the housing which is suspended from a pivot axis on the body so as to be capable of being swung longitudinally of the vehicle, in an arc of a circle of substantial radius, about said pivot axis on the body, a pitman arm actuated by said steering gear extending from said housing, steering linkage including a drag link between said pitman arm and said dirigible road wheels, and a substantially horizontal, longitudinally disposed link having one end pivotally connected to the vehicle frame and its other end pivotally connected to said bar at a point remote from the pivot axis of said bar on the body and substantially in a horizontal plane containing that point of the pitman arm to which the drag link is connected, said link being effective upon relative longitudinal movement between the frame and the body to swing said steering gear relatively to the body to maintain that end of the pitman arm to which the drag link is connected, in a substantially constant position relatively to the frame, so that undesired steering movement of the steering linkage and dirigible road wheels relatively to the frame is prevented.

2. The combination according to claim 1 in which a steering column extends upwardly from said steering gear housing to which it is rigidly connected, said steering column being resiliently supported on the body at a point adjacent to the pivot axis of the steering gear housing on the body.

RICHARD C. STOLTE.